Figure 1:
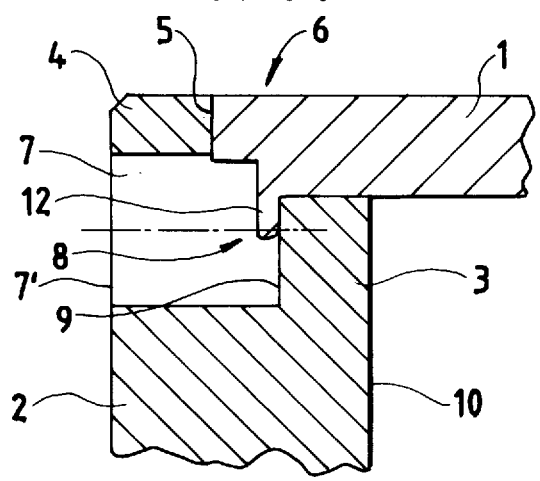

United States Patent [19]
Neumann et al.

[11] Patent Number: 5,844,337
[45] Date of Patent: Dec. 1, 1998

[54] ELECTRIC MOTOR

[75] Inventors: Frank Neumann, Emmenbruecke; Joachim Steffan, Giswil; Jürgen Mayer, Sachseln, all of Switzerland

[73] Assignee: Interelectric AG, Sachseln, Switzerland

[21] Appl. No.: 834,765

[22] Filed: Apr. 3, 1997

[30] Foreign Application Priority Data

Apr. 10, 1996 [DE] Germany ............. 196 14 218.0

[51] Int. Cl.⁶ .................... H02K 5/00; H02K 5/15
[52] U.S. Cl. .................... 310/89; 310/42; 310/43
[58] Field of Search ............... 310/89, 85, 42, 310/43; 29/596, 592.1

[56] References Cited

U.S. PATENT DOCUMENTS

| | | | |
|---|---|---|---|
| 1,270,758 | 6/1918 | Wilson | 29/592.1 |
| 1,710,999 | 4/1929 | Schmid | 29/592.1 |
| 2,701,318 | 2/1955 | Feiertag | 310/89 |
| 3,289,018 | 11/1966 | Schaefer | 310/89 |
| 3,320,660 | 5/1967 | Otto | 29/596 |
| 3,567,973 | 3/1971 | Mastrodonato | 310/42 |
| 4,585,966 | 4/1986 | Nishida et al. | 310/87 |
| 4,705,974 | 11/1987 | White | 310/89 |

FOREIGN PATENT DOCUMENTS

| | | |
|---|---|---|
| 0 545 698 | of 0000 | European Pat. Off. |
| 1583878 | of 0000 | France . |
| 1868377 | of 0000 | Germany . |
| 41 36 924 | of 0000 | Germany . |
| 740 4546 | of 0000 | Germany . |

*Primary Examiner*—Nestor Ramirez
*Assistant Examiner*—B. Mullins
*Attorney, Agent, or Firm*—Tilton, Fallon, Lungmus & Chestnut

[57] ABSTRACT

The present invention refers to an electric motor including a tubular housing member and at least one cover secured thereto, said cover having an insertion area, which is inserted in the housing member in an essentially tight-fitting manner and which is connected to said housing member by means of at least one deformed portion of an end face area of said housing member. This kind of connection between the cover and the housing member is to be improved. This improvement is achieved by the features that the cover abuts on an end face of the housing member via a flange and that it has at least one opening in the transition region of the insertion area and the flange, said opening being accessible from outside via an access opening and forming an undercut portion at the insertion area, a respective portion of the end face area of the housing member being deformed into engagement with said undercut portion by moving the ram into said access opening, whereby the cover is locked in position on said housing member. One advantage of the present invention is to be seen in the fact that only the housing member has to be deformed for establishing the connection. In addition, the cover itself acts as a stop member so that the housing member can have a very simple structural design.

9 Claims, 4 Drawing Sheets

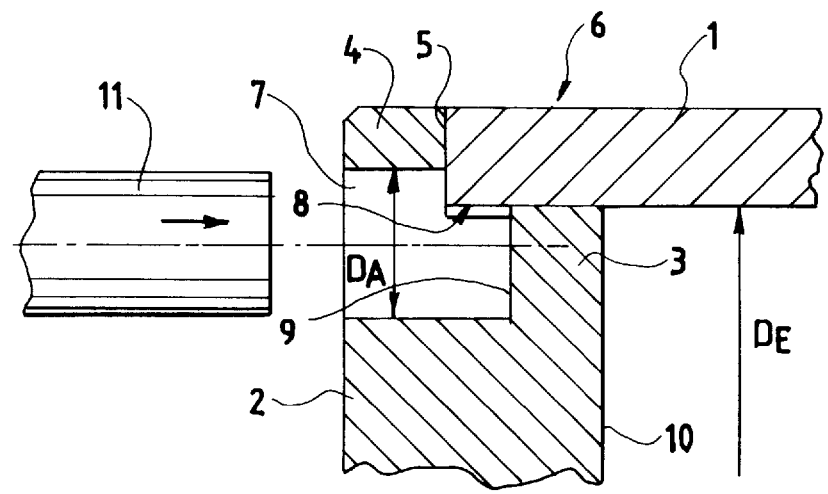
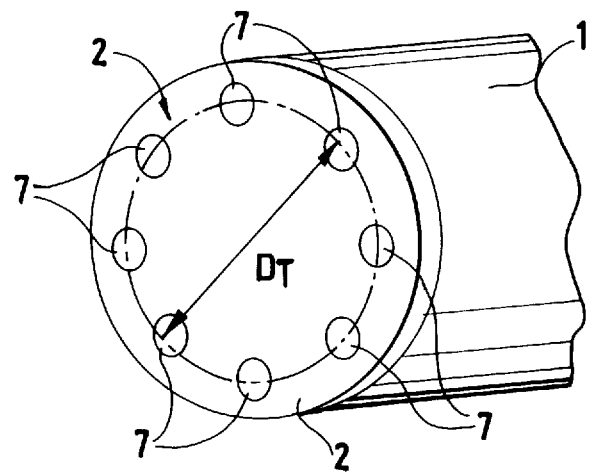

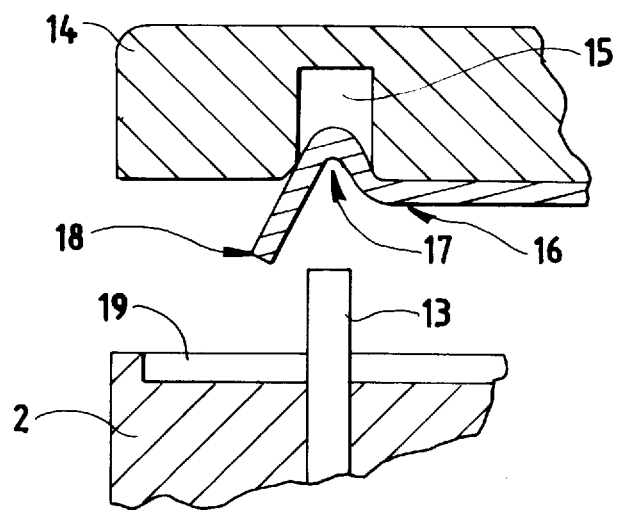
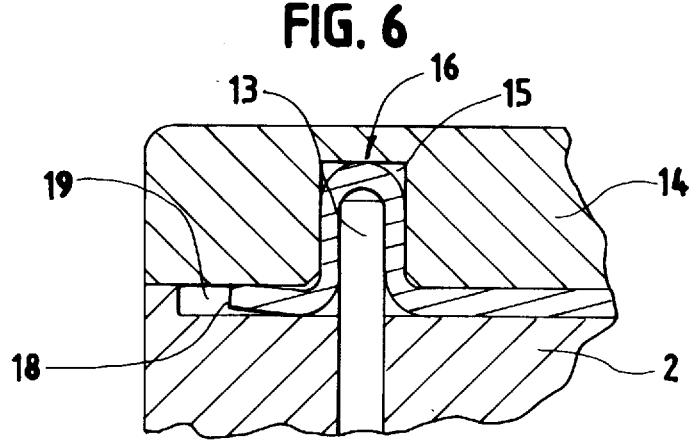

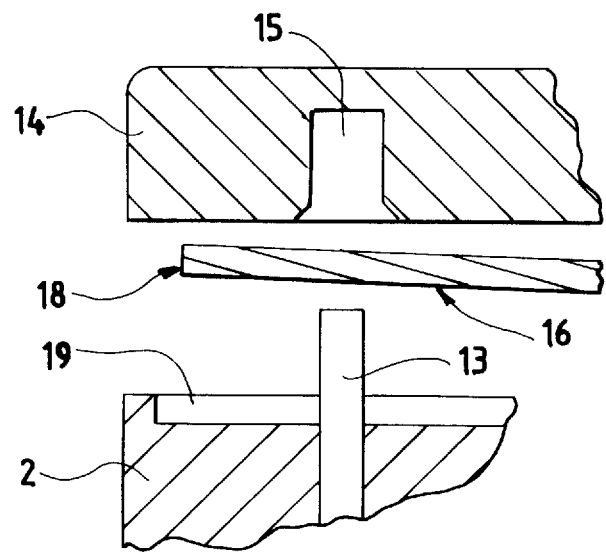
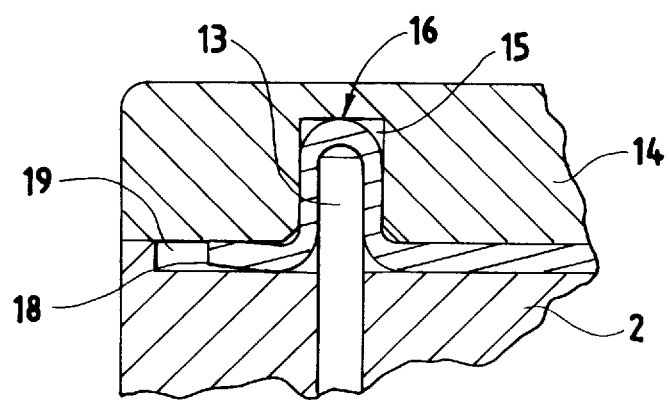

ELECTRIC MOTOR

The present invention refers to an electric motor including a tubular housing member and at least one cover secured thereto, said cover having an insertion area, which is inserted in the housing member in an essentially tight-fitting manner and which is connected to said housing member by means of at least one deformed portion of an end face area of said housing member.

Especially in the case of small electric motors it is common practice that a cover made of plastic material is inserted into the end of a tubular housing member in an essentially tight-fitting manner until it abuts on a stop and that, subsequently, the end face end of said housing member, which encloses said cover like a collar, is deformed in specific sections thereof by means of impressing, whereby also the corresponding areas of the cover are deformed. On the one hand, this structural design necessitates that a stop for the cover is provided in the interior of the housing member; on the other hand, the fastening points are located on the outer surface so that they are exposed to all kinds of external influences. In addition, this kind of fastening of the cover cannot be carried out with all materials, since a substantial deformation takes place in the fastening area on the cover. Hence, attempts are made to improve this type of structural designs.

It is the object of the present invention to provide an electric motor of the type mentioned at the beginning in the case of which the connection means and technique between the cover and the housing member have been improved.

According to the present ivention, this object is achieved by the features that the cover abuts on an end face of the housing member via a flange and that it has at least one opening in the transition region of the insertion area and the flange, said opening being accessible from outside via an access opening and forming an undercut portion at the insertion area, a respective portion of the end face area of the housing member being deformed into engagement with said undercut portion by moving a ram into said access opening, whereby the cover is locked in position on said housing member.

The present invention offers the advantage that the whole end face area of the housing member is protectively covered by a flange of said cover, said flange being additionally used for axially positioning the cover. Hence, it is not necessary to provide any stop means in the interior of the housing member, and this permits a simpler structural design of said housing member. In addition, the deformation of the end face area of the housing member takes place at protected points within the area surrounded by the outer circumference of the housing member and the flange of the cover. Moreover, due to the provision of an undercut portion, it is superfluous to deform also certain areas of the cover in the case of such an arrangement. Hence, a large number of different materials can be used for forming the cover, since said cover does not take part in the deformation process. In addition, the measure of forcing material of sections of the end face area into the undercut portion always guarantees that the flange will reliably abut on said end face area, since, due to the deformation process, one force component will always act in the direction of the interior of the housing member.

For the sake of completeness, reference is made to the fact that, for the present invention, it is not absolutely necessary that the flange of the cover rests directly on the end face area of the housing member, but an intermediate arrangement of additional components, such as sealing means or the like, should also be taken into account.

It will be advantageous when the openings are implemented as axially parallel openings in the flange which extend into the insertion area and which are open at the outer circumference of said insertion area for receiving therein the end face area of the housing member. By means of this structural design, the undercut portion as well as the access opening can be produced by means of openings having a simple geometrical design. In addition, the main direction of deformation of this embodiment is also axially parallel to the axes of the cover and of the housing member, whereby deformations can be carried out simultaneously in the various openings by means of a comparatively simple structural design of the ram.

When, in accordance with one variant, the cross-section predetermined by the insertion area intersects all the opening cross-sections which serve to fasten the cover, the undercut portion is automatically formed in all the openings without any necessity of fulfilling high demands with regard to the formation of said undercut portions, e.g. in an injection moulding machine.

For obtaining during the deformation operation an application of force which is as uniform as possible and a correspondingly uniform fastening of the cover, a plurality of openings can uniformly be distributed on the same reference circle around the axis of the cover. On the basis of this uniform arrangement, it will also be more easily possible to use the openings for possible other purposes, e.g. for fixing additional components.

In accordance with an advantageous embodiment, the external diameter defined by the openings can be larger than the diameter of the insertion area and the internal diameter defined by the openings can be smaller than the diameter of the insertion area. On the basis of a cylindrical structural design of the housing member and of the cover, this advantageous embodiment will guarantee that, when the insertion area of the cover is being inserted, the end face area of the housing member will always be arranged automatically within the opening after having come into contact with the flange. The dimensions of the diameters can then always be adapted to the circumstances in question and to the desired strength of the connection, since the amount of material available for deformation is automatically predetermined by these predetermined dimensions of the diameters.

The present invention additionally refers to an additional embodiment.

This embodiment refers to an electric motor provided with contacts which project beyond the cover at an end of the end face thereof and which are in contact with corresponding countercontacts of a housing attachment member arranged in the area of the cover, in particular according to one of the claims 1 to 5. This embodiment is characterized by the features that the respective contacts on said cover are provided with cutting or crimping blades which, in the attached condition, are inserted in complementary recesses in said housing attachment member, the countercontacts extending, in the non-attached condition, across at least certain areas of the open sides of said recesses facing the cover, and that, in the attached condition, said countercontacts are, at least in certain areas thereof, forced into said recesses by said cutting or crimping blades and clamped in position in said recesses.

This embodiment has the advantage that, once the cover has been attached to the housing member, a housing attachment member can be contacted with the contacts provided on the cover in the shortest possible time simply by attaching said housing attachment member. Time-consuming and expensive soldered joints, which were previously used for some type of housing attachment members, are no longer necessary for this purpose. This embodiment especially offers extreme advantages as far as production is concerned because special contacting facilities need no longer be provided on the housing attachment member, but it suffices to use the conductor ends available.

In order to guarantee the largest possible contact area, the free end of the countercontacts can, in the non-attached condition, extend across the recesses in such a way and with such a length that, in the attached condition, the free ends of said countercontacts are still arranged outside of said recesses when said countercontacts have been forced into said recesses along certain areas thereof. This guarantees that, within said recesses, the contacts are in contact with the countercontacts on all contact sides.

It will be advantageous when, in the attached condition, the free end of said countercontacts is wedged in between the cover and the housing attachment member. This is an additional safety measure at the end of the attachment operation. Furthermore, the free end can then also be positioned precisely, whereby faulty contacting can be avoided.

According to one variant, it is suggested that the respective countercontacts are formed by a strip material provided with a preformed bend in the area of said recesses. The strip material then offers a desired resistance against being forced into the respective recess so that the housing attachment member is clamped in position in a desired manner. In this connection, it would definitely be imaginable that this arrangement also serves as a fastening means for the housing attachment member.

A particularly simple variant is a variant in the case of which the respective countercontacts are formed by deformable stranded conductors, whereby stripped cable ends can be used as countercontacts in a simple manner.

The housing attachment member can also be attached to the cover via locking means, said locking means permitting rapid attachment and securing of the contact points.

The present invention additionally refers to a method of fastening a cover, which is provided with an insertion area and a flange, in a housing member of an electric motor according to one of the claims 1 to 11. This method is characterized by the steps of
 a) inserting said insertion area into the housing member until the flange abuts on the end face of said housing member,
 (b) introducing a ram into the opening and deforming a portion of the end face area into the undercut portion of said opening.

This method offers the advantage that only the material of the housing member has to be deformed and that this material will tightly fit to the undercut portion in the cover according to the predetermined shape of said undercut portion.

The method can be carried out in a particularly simple manner, when, according to one variant thereof, the ram moves into the opening essentially parallel to the axis of the cover and of the housing member and deforms the portion of the end face area essentially radially towards said axis. The connection between the cover and the housing member, which is carried out in a riveting fashion, can take place within an extremely small space in the case of this variant of the method.

Figure 2:
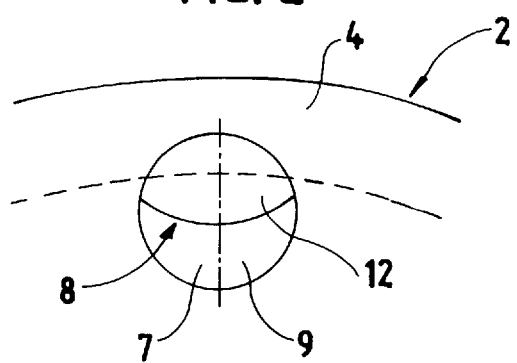

In the following, embodiments of the present invention will be explained in detail on the basis of a drawing, in which:

FIG. 1 shows a sectional view of a fastening point between the cover and the housing member, FIG. 2 shows a view of said fastening point of FIG. 1 from the left, FIG. 3 shows the fastening point similar to FIG. 1 a short time before the deformation and the introduction of a ram, FIG. 4 shows a scaled-down perspective fragmentary view of a cover secured to the housing member, FIG. 5 shows a sectional fragmentary view of a connection variant between contacts of the cover and a housing attachment member, in the non-attached condition, FIG. 6 shows the components according to FIG. 5 in the attached condition, FIG. 7 shows a sectional fragmentary view of a further connection variant between contacts projecting beyond a cover and a housing attachment member, in the non-attached condition and FIG. 8 shows the components according to FIG. 7 in the attached condition.

As can especially be seen from FIG. 4, the electric motor according to the present invention comprises especially a housing member 1 having the shape of a cylindrical tube and a cover 2 secured to said housing member 1 on at least one side thereof. According to its desired function, the cover 2 can additionally be provided with centrically arranged openings for passing the shaft therethrough or with bearing reception means and similar configurations formed at this location.

According to FIG. 1 and FIG. 3, the cover 2 has a cylindrical insertion area 3, which is inserted in the housing aperture of the housing member 1 in an essentially tight-fitting manner, and a circumferentially extending flange 4 which is in contact with an end face 5 of an end face area 6 of said housing member. Along a reference circle having the diameter $D_T$ and shown in FIG. 4, a plurality of uniformly distributed cylindrical openings 7 is provided in said cover 2. The diameter $D_A$ of said openings 7 is dimensioned such that the sum of the diameters $D_A+D_T$ is larger than the diameter $D_E$ of the insertion area 3 and the internal diameter of the housing member 1, respectively. This guarantees that, on the basis of the depth of the opening 7 which has been chosen in the present case and which is longer than the thickness of the flange 4, the opening 7 is automatically open in the transition section of the insertion area 3 and the back of the flange 4. When the cover 2 is being inserted in the housing member 1, the future deformation region 8 of the end face area 6 is therefore arranged directly within the opening 7. The bottom 9 of the opening 7 additionally serves as an undercut portion relative to the front side 10 of the insertion area 3.

The connection between the cover 2 and the housing member 1 is now effected by deforming said deformation region 8 in the manner described hereinbelow.

In the following, the mode of action and the mode of functioning of the present invention will be explained in detail.

For connecting the cover 2 with the housing member 1, the insertion area 3 of said cover is inserted into the housing member 1 until the end face 5 comes into contact with the flange 4. This will have the effect that the deformation region 8 of the housing member 1 will automatically be arranged within the openings 7.

Subsequently, a ram 11 is is introduced in each access aperture 7' of the openings 7 which is accessible from outside. The ram 11 is introduced parallel to the axis of the cover 2 and of the housing member 1 and in the axial direction of the openings 7. This has the effect that the deformation region 8 is deformed from the initial shape shown in FIG. 3 into the fastening shape shown in FIG. 1 and FIG. 2, respectively. Due to this deformation, a kind of closure head 12 is formed, which comes into engagement with the bottom 9 of the opening 7. The bottom 9 serves then as an undercut portion so that the cover 2 is locked between the end face 5 of the housing member 1 and said closure head 12. This process is repeated in the case of all the openings 7 or it is carried out with a common ram element.

For further protecting the connection point, the opening 7 can then be closed or additional elements can be provided with the aid of the opening 7. Among other advantages, this connection method has the advantage that it is carried out at a comparatively protected point within the area of the cover 2 and that, in addition, only the deformation region 8 of the housing member 1 is deformed.

According to one variant, the cover 2 can, for example, be provided with outwardly projecting cutting or crimping blades 13 serving as contacts for connecting thereto various components. In FIG. 5, a housing attachment member 14 is shown that can be connected to the cover 2 via a locking means, for example. The housing attachment member 14 is provided with a complementary recess 15 for each contact blade 13, a countercontact 16 extending across said recess 15.

According to the present embodiment, said countercontact 16 is made of a wire or strip material and provided with a preformed bend 17 so that the free end 18 projects forward. When the housing attachment member 14 and the cover 2 are being combined, the preformed bend 17 facilitates insertion of the countercontact 16 through the contact blades 13.

As can be seen from FIG. 6, contacting is achieved in a simple manner by combining the two components, the countercontact 16 being forced by means of the contact blade 13 into the recess 15 where it is clamped in position. The free end 18 is then wedged in between an opening 19 in the cover 2 and the housing attachment member and is there reliably positioned. This kind of contacting does not necessitate any difficult and expensive soldering operations and can also be considered to be advantageous with regard to the number of structural components required, since the structural expenditure required for such contacting is comparatively low.

The embodiment according to FIG. 7 and 8 differs from the preceding embodiment only insofar as the countercontacts 16 are formed in a simple manner by stripped stranded conductor ends of a cable. Such stranded conductor ends also adapt themselves very well to the recesses 15 when inserted into said recesses 15 due to the application of the contact blades 13.

It is intended that the foregoing description be only illustrative of the present invention and that the present invention be limited only by the hereinafter appended claims.

We claim:

1. An electric motor including a tubular housing member (1) and at least one cover (2) secured thereto, said cover (2) having an insertion area (3) at a front side (10) of the cover, which is inserted in said housing member (1) in an essentially tight-fitting manner and which is connected to said housing member (1) by means of at least one deformable portion (8) of an end face area (6) of said housing member (1), said cover (2) abutting an end face (5) of said housing member (1) via a flange (4), said cover having at least one cavity (7) in a transition region between said insertion area (3) and said flange (4), each of said at least one cavity (7) being accessible from outside the motor via an access opening (7') in a rear side of said cover (2) and terminating at an undercut portion (9) of said insertion area (3), and wherein each of said cavities has an axis which is parallel to the axis of the motor, each of said cavities expose a portion of the insertion area (3) and expose said deformable portion (8) of the end face area (6) of the housing member (1), each of said deformable portions (8) of said end face area (6) of said housing member (1) being deformed into engagement with said undercut portion (9) by means of moving a ram (11) into said access opening, whereby said cover (2) is locked in position on said housing member (1) and said deformable portions of the end face area (6) of the housing member (1) are located at protected points within an area substantially enclosed by the outer circumference of the housing member (1) and the flange (4) of the cover (2).

2. An electric motor according to claim 1, wherein said plurality of cavities (7) is uniformly distributed on the same reference circle around the axis of said cover (2).

3. An electric motor according to claim 2, wherein the external diameter ($D_T+D_A$) defined by said cavities (7) is larger than the diameter ($D_E$) of said insertion area (3) and that the internal diameter ($D_T-D_A$) defined by said cavities (7) is smaller than the diameter ($D_E$) of said insertion area (3).

4. An electric motor according to claim 1, and including contacts (13) which project beyond said cover (2) at an end of said end face thereof and which are in contact with corresponding countercontacts (16) of a housing attachment member (14) arranged in the area of said cover (2), said respective contacts (13) on said cover (2) provided with cutting or crimping blades which, in the attached condition, are inserted in complementary recesses (15) in said housing attachment member (14), said countercontacts (16) extending, in the non-attached condition, across at least certain areas of the open sides of said recesses (15) facing said cover (2), and that, in the attached condition, said countercontacts (16) are, at least in certain areas thereof, forced into said recesses (15) by said cutting or crimping blades (13) and clamped in position in said recesses.

5. An electric motor according to claim 4, wherein, in the non-attached condition, free end areas of said countercontacts (16) extend across said recesses (15) in such a way and with such a length that, in the attached condition, the free ends (18) of said countercontacts (16) are still arranged outside of said recesses (15) when said countercontacts have been forced into said recesses (15) along certain areas thereof.

6. An electric motor according to claim 5, wherein, in the attached condition, said free end (18) of said countercontacts (16) is wedged in between said cover (2) and said housing attachment member (14).

7. An electric motor according to claim 4, 5 or 6, wherein said respective countercontacts (16) are formed by a wire or strip material provided with a preformed bend (17) in the area of said recesses (15).

8. An electric motor according to claim 4, 5 or 6, wherein said respective countercontacts (16) are formed by deformable stranded conductors.

9. An electric motor according to claim 4 wherein said housing attachment member (14) is connected to said cover (2) via locking means.

* * * * *